(12) United States Patent
Noguchi

(10) Patent No.: US 12,498,693 B2
(45) Date of Patent: Dec. 16, 2025

(54) INFORMATION PROCESSING DEVICE AND INFORMATION PROCESSING METHOD

(71) Applicant: FANUC CORPORATION, Yamanashi (JP)

(72) Inventor: Yoshiaki Noguchi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 390 days.

(21) Appl. No.: 18/023,181

(22) PCT Filed: Sep. 9, 2021

(86) PCT No.: PCT/JP2021/033182
§ 371 (c)(1),
(2) Date: Feb. 24, 2023

(87) PCT Pub. No.: WO2022/059595
PCT Pub. Date: Mar. 24, 2022

(65) Prior Publication Data
US 2023/0297065 A1 Sep. 21, 2023

(30) Foreign Application Priority Data
Sep. 16, 2020 (JP) ................................. 2020-155276

(51) Int. Cl.
*G05B 19/406* (2006.01)
(52) U.S. Cl.
CPC .. *G05B 19/406* (2013.01); *G05B 2219/31412* (2013.01)
(58) Field of Classification Search
None
See application file for complete search history.

(56) References Cited

U.S. PATENT DOCUMENTS

2017/0227952 A1* 8/2017 Taira .................. G05B 19/4069
2017/0242408 A1* 8/2017 Uchida ............ G05B 19/40938
(Continued)

FOREIGN PATENT DOCUMENTS

CN 1942272 4/2007
CN 102639286 8/2012
(Continued)

OTHER PUBLICATIONS

International Search Report issued Nov. 22, 2021 in corresponding International Application No. PCT/JP2021/033182.

*Primary Examiner* — David Earl Ogg
(74) *Attorney, Agent, or Firm* — Wenderoth, Lind & Ponack, L.L.P.

(57) ABSTRACT

Provided is an information processing device which extracts a means which reduces a manufacturing time pertaining to a machining pre-step, a machining step, and a machining post-step in manufacturing artifacts by means of a control device, the information processing device comprising: a storage unit which stores machining-related information related to the machining of a workpiece and includes a machining program; a manufacturing time estimation unit which estimates at least one work step from the machining-related information stored in the storage unit and calculates the manufacturing time necessary for the machining of a workpiece by calculating the time taken for the estimated work step; and a reducing means determination unit which selects, from among a plurality of means pre-stored in the storage unit, a means for reducing the time for the at least one work step estimated by the manufacturing time estimation unit.

5 Claims, 4 Drawing Sheets

(56) References Cited

U.S. PATENT DOCUMENTS

2017/0329312 A1* 11/2017 Ishiwari ............ G05B 19/4103
2019/0064779 A1*  2/2019 Ichinose ............ G05B 19/4155

FOREIGN PATENT DOCUMENTS

| | | |
|---|---|---|
| CN | 205950581 | 2/2017 |
| CN | 106483925 | 3/2017 |
| CN | 107092235 | 8/2017 |
| CN | 111613528 | 9/2020 |
| JP | 2-109657 | 4/1990 |
| JP | 2007-58531 | 3/2007 |
| JP | 2007058531 A * | 3/2007 |
| JP | 2008-183706 | 8/2008 |
| JP | 2015-182173 | 10/2015 |
| JP | 2019-40311 | 3/2019 |
| JP | 2020-86759 | 6/2020 |
| JP | 2020-199611 | 12/2020 |
| TW | 201416164 | 5/2014 |
| WO | 2019/139086 | 7/2019 |

\* cited by examiner

FIG. 3
TABLE OF RECOMMENDED VALUES

| SHREDDING CHIPS | OSCILLATION FREQUENCY MULTIPLYING FACTOR | OSCILLATION AMPLITUDE MULTIPLYING FACTOR |
|---|---|---|
| EVERY 2/3 ROTATION OF SPINDLE AXIS | 1.2 TIMES | 1.0 TIMES |
| EVERY TWO ROTATIONS OF SPINDLE AXIS | 0.4 TIMES | 1.0 TIMES |
| EVERY THREE ROTATIONS OF SPINDLE AXIS | 0.266 TIMES | 1.1 TIMES |

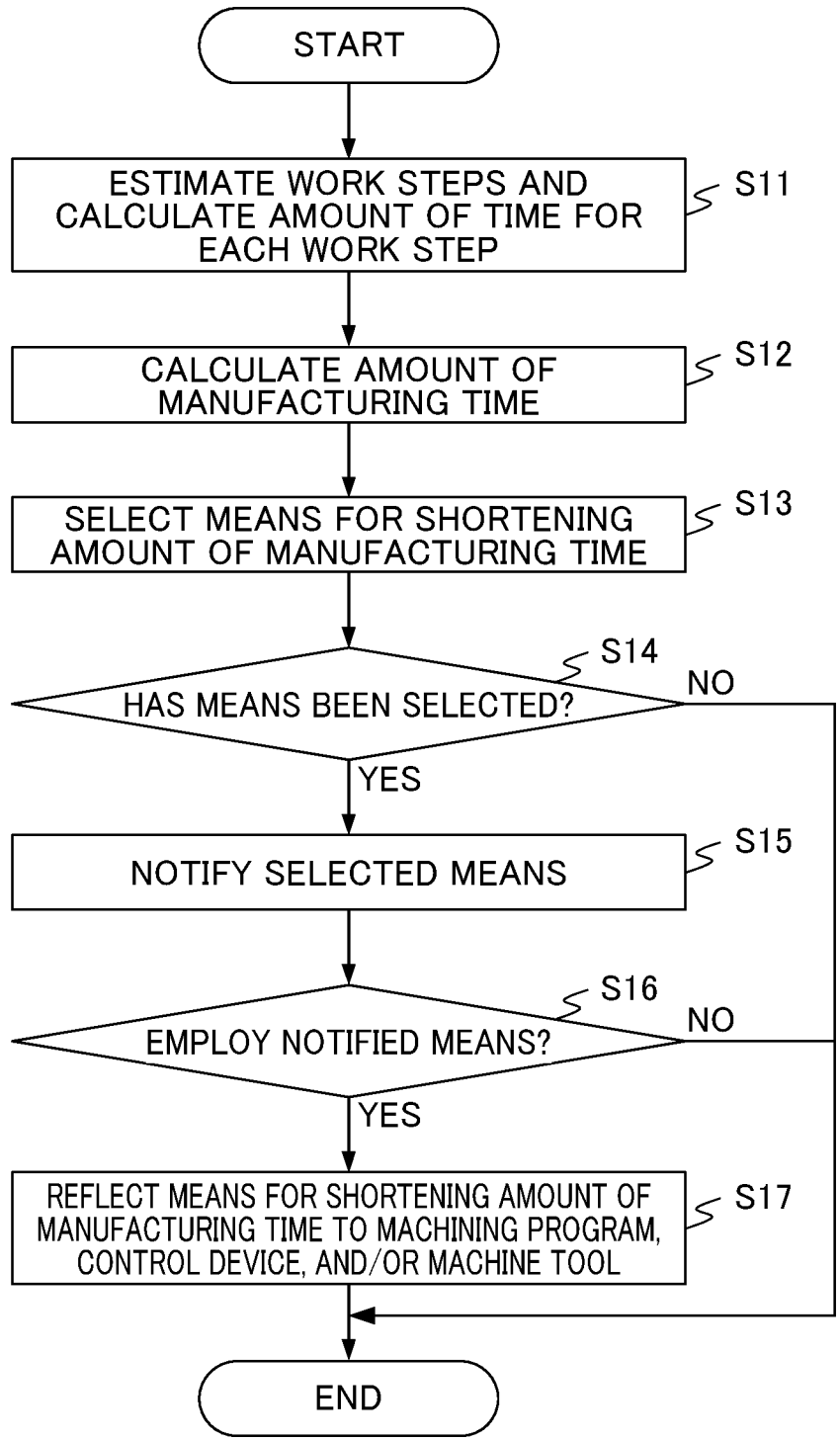

INFORMATION PROCESSING DEVICE AND INFORMATION PROCESSING METHOD

TECHNICAL FIELD

The present invention pertains to an information processing device and an information processing method.

BACKGROUND ART

In machining using a machine tool, in order to shorten an amount of machining time, a function for creating a speed profile in which a tool passes through a program path in a shortest amount of time under a constraint condition has been developed for a numerical control device.

In addition, there is known a technique in which a machining completion time for a machine tool is predicted and a preparatory motion in which a robot is used to interchange a workpiece is made to complete when the machine tool completes machining, whereby the robot performs a workpiece exchange operation immediately after the completion of machining, and operating efficiency for the robot increases. For example, refer to Patent Document 1.

There is also known a technique for, based on each tool suitable for a machining shape and a cutting condition for each tool, calculating an amount of machining time for each tool and automatically selecting a tool for which the amount of machining time is shortest. For example, refer to Patent Document 2.

Patent Document 1: Japanese Unexamined Patent Application, Publication No. 2015-182173
Patent Document 2: Japanese Unexamined Patent Application, Publication No. H2-109657

DISCLOSURE OF THE INVENTION

Problems to be Solved by the Invention

Incidentally, for example, an amount of manufacturing time when mass-producing a component or mold by metal machining that includes cutting, press working, electrical discharge machining, and the like corresponds to a total amount of time for pre-machining steps, metal machining, and post-machining steps. An amount of time for pre-machining steps includes, for example, an amount of time to install a workpiece, an amount of time for conveyance of a workpiece from a pre-process (for example, machining by another machine tool), and the like. In addition, the amount of time for post-machining steps includes an amount of time for removing chips inside a machine tool that were generated by metal machining or taking away burrs that were generated on a machined surface of a workpiece after metal machining.

Recently, there has been development of, inter alia, a technique for reducing the size of chips from, inter alia, an oscillation cutting technique at a time of lathe machining.

However, there is still a need for a user, who is a worker or the like for a machine tool, to themself understand various functions or means for shortening the amount of manufacturing time and determine, from a result of test machining and the like, whether each function or means is effective or not. Accordingly, it is difficult to determine by how much the amount of manufacturing time can be shortened in accordance with which function or means is selected.

Accordingly, there is a desire for an information processing device and an information processing method that make it possible to easily select a means for shortening an amount of time required for each work step and shortening an amount of manufacturing time.

Means for Solving the Problems

One aspect of an information processing device according to the present disclosure is configured to extract, with respect to a control device that calculates an output pulse to a motor included in a machine tool based on a machining program, a means for shortening an amount of manufacturing time for a pre-machining step, a machining step, and a post-machining step in manufacture of a machined product using the control device. The information processing device includes: a storage unit configured to store machining-related information that relates to machining of a workpiece and includes the machining program; an amount of machining time estimation unit configured to estimate, from the machining-related information stored in the storage unit, at least one work step necessary for machining of the workpiece and calculate an amount of manufacturing time necessary for machining of the workpiece by calculating an amount of time for the estimated at least one work step; and a shortening means determination unit configured to select, from a plurality of means stored in advance in the storage unit, a means for reducing the amount of time for the at least one work step estimated by the amount of machining time estimation unit and shortening the amount of manufacturing time.

One aspect of an information processing method according to the present disclosure is adapted for an information processing device configured to extract, with respect to a control device that calculates an output pulse to a motor included in a machine tool based on a machining program, a means for shortening an amount of manufacturing time for a pre-machining step, a machining step, and a post-machining step in manufacture of a machined product using the control device. The information processing method includes: an amount of machining time estimation step for estimating, from machining-related information that relates to machining of a workpiece, includes a machining program, and is stored in a storage unit included in the information processing device, at least one work step necessary for machining of the workpiece and for calculating an amount of manufacturing time necessary for machining of the workpiece by calculating an amount of time for the estimated at least one work step; and a shortening means determination step for selecting, from a plurality of means stored in advance in the storage unit, a means for reducing the amount of time for the estimated at least one work step and shortening the amount of manufacturing time.

Effects of the Invention

By virtue of one aspect, it is possible to provide an information processing device and an information processing method that make it possible to easily select a means for shortening an amount of time required for each work step and shortening an amount of manufacturing time.

BRIEF DESCRIPTION OF THE DRAWINGS

FIG. 3 illustrates an example of a table of recommended values; and

FIG. 4 is a flow chart for describing one example of an amount of machining time shortening process for metal machining, in an information processing device.

PREFERRED MODE FOR CARRYING OUT THE INVENTION

One Embodiment

Firstly, an outline of the present embodiment is described. In the present embodiment, an information processing device performs an analysis from, inter alia, machining-related information relating to machining, such as a machining program stored in a storage unit included in the information processing device or information pertaining to a machined product, estimates work steps envisioned for machining the workpiece by a machine tool as well as work steps other than machining such as conveying the workpiece, for example, and calculates an amount of time for each estimated work step to thereby calculate an amount of time necessary for pre-machining steps, machining steps, and post-machining steps that pertain to machining of the workpiece. The information processing device selects, from among a plurality of means stored in advance in a storage unit, a means for shortening an amount of time required for a work step from among the estimated work steps to thereby reduce the total amount of manufacturing time.

As a result, by virtue of the present embodiment, it is possible to provide an information processing device and an information processing method that solve the problem "make it possible to easily select a means for shortening an amount of time required for each work step and shortening an amount of manufacturing time".

The above is an outline of the present embodiment.

Next, using the drawings, description is given in detail regarding a configuration according to the present embodiment. Here, the amount of manufacturing time is exemplified as an amount of time resulting from adding together an amount of time for pre-machining steps taken for a metal workpiece to be conveyed from, inter alia, a pre-process machine tool and for the workpiece to be installed in a machine tool for the next step (in other words, a machining step); an amount of metal machining time for the workpiece to be machined by the machine tool for the current step; and an amount of time for post-machining steps for, inter alia, the machined workpiece to be extracted from the machine tool for the current step and conveyed to a measuring instrument for the machined workpiece to be measured, and for the machined workpiece to be deburred and for chips inside the machine tool to be removed. Note that, in the present invention, as described below, the amount of time for pre-machining steps may include an amount of work time other than for conveying a workpiece or setting the workpiece in a machine tool, and the amount of time for post-machining steps may include an amount of work time other than for measuring or deburring the workpiece or removing chips.

Figure 1:
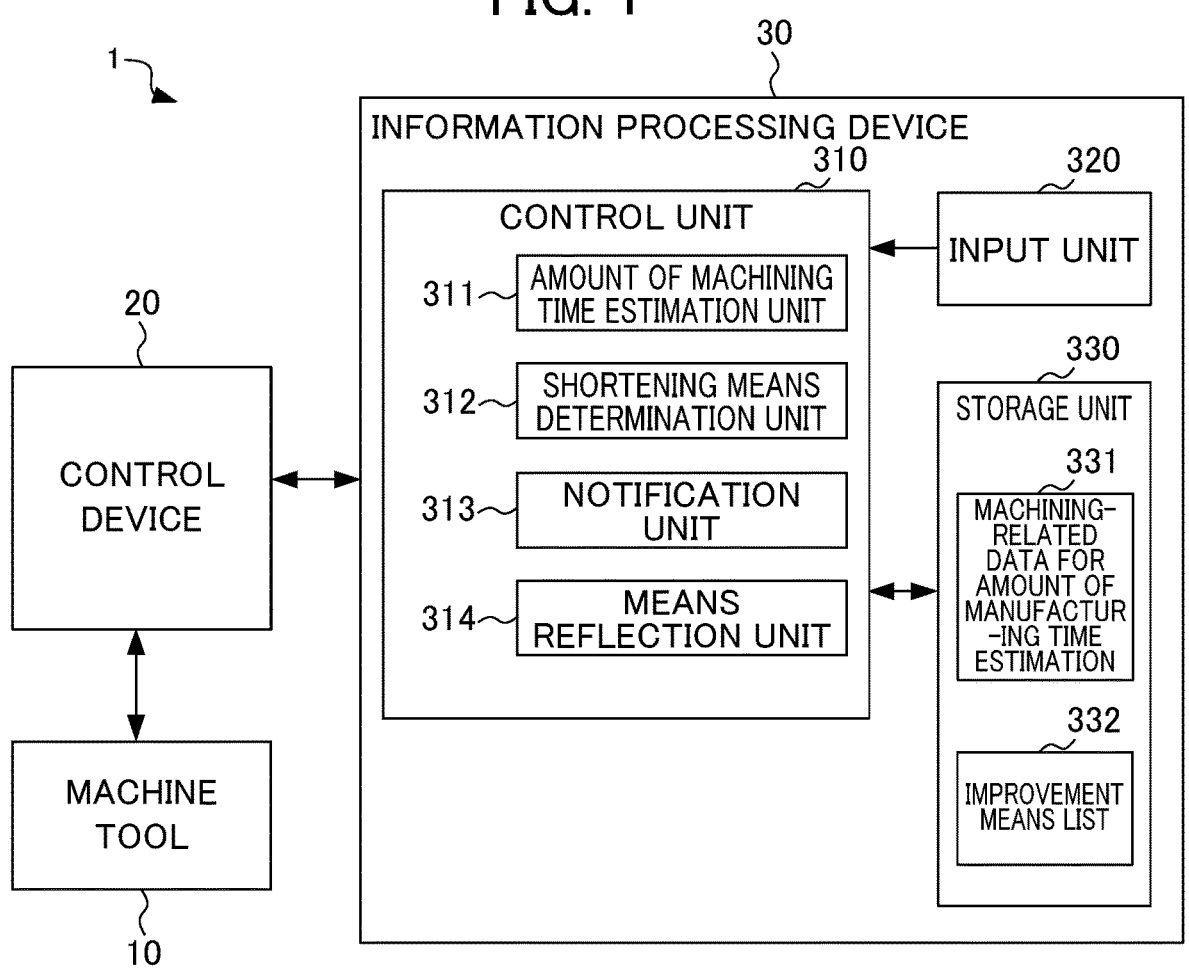
FIG. 1 is a functional block diagram illustrating an example of a functional configuration of an information processing system according to one embodiment.

FIG. 1 is a functional block diagram illustrating an example of a functional configuration of an information processing system according to one embodiment. As illustrated in FIG. 1, an information processing system 1 has a machine tool 10, a control device 20, and an information processing device 30.

The machine tool 10, the control device 20, and the information processing device 30 may be directly connected to each other via a connection interface (not shown). Note that the machine tool 10, the control device 20, and the information processing device 30 may be connected to each other via a network such as a local area network (LAN). In this case, it may be that the machine tool 10, the control device 20, and the information processing device 30 are each provided with a communication unit (not shown) for communicating with each other via the corresponding connection.

Note that the information processing device 30 may be included in the control device 20, as described below. In addition, the control device 20 may be included in the machine tool 10, as described below.

The machine tool 10 is a machine tool that is publicly known to a person skilled in the art. For example, the machine tool 10, based on an operation command from the control device 20, uses a tool such as an edged tool attached to a spindle axis included in the machine tool 10 to perform metal machining such as cutting on a workpiece disposed in the machine tool 10.

Note that the machine tool 10, for example, may be, inter alia, a robot or peripheral device that conveys a workpiece or attaches a workpiece to a machine tool.

The control device 20 is a numerical control device that is publicly known to a person skilled in the art, and obtains a machining program from an external device (not shown) such as a CAD/CAM device or the information processing device 30, which is described below. The control device 20, based on the obtained machining program, calculates an output pulse for a motor (not shown) included in the machine tool 10 to thereby calculate an operation command, and transmits the calculated operation command to the machine tool 10. As a result, the control device 20 can drive the machine tool 10.

Note that, in a case where the machine tool 10 is a robot or the like, the control device 20 may be a robot control device or the like.

<Information Processing Device 30>

The information processing device 30 is a computer device publicly known to a person skilled in the art, and has a control unit 310, an input unit 320, and a storage unit 330 as illustrated in FIG. 1. In addition, the control unit 310 has an amount of machining time estimation unit 311, a shortening means determination unit 312, a notification unit 313, and a means reflection unit 314. In addition, the storage unit 330 stores machining-related data for amount of manufacturing time estimation 331, and an improvement means list 332.

<Input Unit 320>

The input unit 320 is, for example, a keyboard, a touch panel, or the like, and accepts an input from a user who is a worker or the like.

<Storage Unit 330>

It may be that the storage unit 330 is a ROM (read-only memory), an HDD (hard disk drive), or the like, and stores the machining-related data for amount of manufacturing time estimation 331 and the improvement means list 332 together with various control programs.

The machining-related data for amount of manufacturing time estimation 331 is information that relates to machining of a workpiece and is required to estimate an amount of manufacturing time, such as the material and shape of a work, and includes a machining program.

Specifically, the machining-related data for amount of manufacturing time estimation 331, for example, includes information pertaining to machining including the machining program workpiece information (material, shape), etc.; information pertaining to a tool used in machining, including the tool diameter, the tool material, a number of blades of the tool, etc.; and information pertaining to non-machining work including an amount of time for workpiece attaching, an amount of time for deburring, an amount of time for work to remove chips, an amount of time for workpiece measurement, etc.

For example, a machining program inputted in advance by a user via the input unit 320 or a machining program obtained from the control device 20 may be included in the information pertaining to machining. In addition, for example, workpiece information regarding the material or shape of a workpiece and inputted in advance by a user via the input unit 320 may be included in the information pertaining to machining, or workpiece information such as a finished shape or the material of a workpiece identified by analyzing a machining program may be stored in the information pertaining to machining.

For all tools that can be attached to the machine tool 10, the tool diameter, tool material, number of blades on the tool, and the like may be stored in advance in the information pertaining to a tool.

It may be that, from among an amount of time for pre-machining steps and an amount of time for post-machining steps, an amount of time for conveyance, an amount of time for workpiece attaching, an amount of time for deburring, an amount of time for workpiece measurement, an amount of time for maintenance (cleaning, component replacement, periodic removal of chips) of equipment in order to continue to perform machining, and the like, which are amounts of time for respective steps and were recorded at least a certain amount of time in the past, are stipulated in advance from predictions or actual amounts of time for each instance of work thus far and are stored in the information pertaining to non-machining work (a list of amounts of time for work).

Note that each of the amount of time for conveyance, the amount of time for workpiece attaching, the amount of time for deburring, the amount of time for workpiece measurement, the amount of maintenance time, and the like from among the amount of time for pre-machining steps and amount of time for post-machining steps in the information pertaining to non-machining work (a list of amounts of time for work) may be, for example, sequentially measured by the control device 20 or the information processing device 30 and updated by the information processing device 30.

For example, a plurality of means for shortening amounts of time (for example, adding or reducing a machining procedure) in each of the amount of time for pre-machining steps, amount of metal machining time, and amount of time for post-machining steps are set in advance in the improvement means list 332.

Specifically, for example, because the time when a pre-process ends and an amount of time for conveyance after the end time are included in the amount of time for pre-machining steps, in a case where the amount of time for pre-machining steps is large, a means such as "adjust timing between end time for pre-machining step and start time for machining step" or "reviewing conveyance path" may be stored in the improvement means list 332.

In addition, for example, a means such as a "tool less likely to generate burrs" may be stored in the improvement means list 332 such that the means is selected in a case where a workpiece made of a material for which burrs are more likely to occur even with the same machining program has been selected for the amount of metal machining time. Alternatively, a means such as "re-doing from structural design to a shape less likely to generate burrs" or "reviewing machining program" may be stored in the improvement means list 332 in a case where the quantity of burrs generated is large, in the amount of metal machining time.

In addition, a means such as "oscillation cutting function" may be stored in the improvement means list 332 in a case where the amount of cutting for cutting in one occasion in lathe machining is large, in the amount of metal machining time.

In addition, for example, a means such as "reviewing conveyance path" or "reviewing structural design for attachment jig" may be stored in the improvement means list 332 in a case where an amount of time resulting from adding together an amount of time for conveyance to a workplace for deburring, an amount of time for attaching a workpiece to a measuring instrument, or the like takes up more time than an amount of time for deburring, in an amount of time for post-machining steps. In addition, a means such as an "oscillation cutting function" for reducing the size of chips, in order to reduce the amount of time for chip removal in the amount of time for post-machining steps, may be stored in the improvement means list 332.

<Control Unit 310>

The control unit 310 is something publicly known to a person skilled in the art that has a CPU (central processing unit), a ROM (read-only memory), a RAM (random-access memory), a CMOS (complementary metal-oxide-semiconductor) memory, etc., with each of these configured to be able to mutually communicate via a bus.

The CPU is a processor that comprehensively controls the information processing device 30. The CPU reads out, via the bus, a system program and an application program that are stored in the ROM, and controls the entirety of the information processing device 30 in accordance with the system program and the application program. As a result, as illustrated in FIG. 1, the control unit 310 is configured to realize functionality for the amount of machining time estimation unit 311, the shortening means determination unit 312, the notification unit 313, and the means reflection unit 314. Various data such as temporary calculation data or display data is stored in the RAM. In addition, the CMOS memory is supported by a battery (not shown), and is configured as a non-volatile memory for which a storage state is held even if a power supply for the information processing device 30 is turned off.

<Amount of Machining Time Estimation Unit 311>

From the machining-related data for amount of manufacturing time estimation 331 stored in the storage unit 330, the amount of machining time estimation unit 311 estimates work steps that are pre-machining steps, metal machining, and post-machining steps necessary to machine a workpiece and calculates an amount of time for each estimated work step to thereby calculate an amount of manufacturing time necessary to machine the workpiece.

Specifically, for example, the amount of machining time estimation unit 311 calculates the amount of time for pre-machining steps based on, inter alia, an amount of time for conveyance from a machine tool or the like for a pre-process and an amount of time for attaching the workpiece to the machine tool 10, which are in the amount of time for pre-machining steps included in the information pertaining to non-machining work (a list of amounts of time for work), among the machining-related data for amount of manufacturing time estimation 331. Note that, it may be that information is obtained from the machine tool or the like for the pre-process to obtain a scheduled end time for the pre-process, whereby the amount of time for conveyance in a pre-machining step is calculated from an end time interval for the pre-process. Specifically, for example, even in a case it is assumed that machining is performed at intervals of ten minutes for a pre-process, the amount of time for conveyance is one minute, and the actual amount of machining time is four minutes, because machining is performed at intervals of ten minutes for the pre-process, the workpiece will arrive from the pre-process every ten minutes. In other words, it may be that the end time interval (a ten minute interval) for the pre-process is made to be the amount of time for conveyance (amount of pre-machining time).

In addition, the amount of machining time estimation unit 311 may calculate the amount of metal machining time by predicting a machining completion time in a machining step after analyzing in advance a simulation or the like for a machining program included in the information pertaining to machining in the machining-related data for amount of manufacturing time estimation 331. Alternatively, the amount of machining time estimation unit 311 may calculate the amount of metal machining time based on an actual amount of time for metal machining.

In addition, the amount of machining time estimation unit 311 calculates the amount of time for post-machining steps based on the information pertaining to non-machining work (list of amounts of time for work) and workpiece information (material, shape) included in information pertaining to machining in the machining-related data for amount of manufacturing time estimation 331.

Description is given below by giving an example of a means for shortening the amount of time for post-machining steps. Specifically, description is given regarding two: an example (a) and an example (b). Here, description is given regarding the amount of time for post-machining steps in, as the example (a), a case where a portion for which burrs are likely to occur in terms of a machining shape during machining, for example an orthogonal tool path, arises in relation to deburring, and an amount of time for post-machining steps in, as the example (b), a case where there is a straight-line machining command from which there is no release in lathe-turning machining, for example a case where machining is lathe machining and there is a portion for which it is determined that an amount of cutting will be large from a comparison of coordinate values to that of the original workpiece shape or a case in which there is a long cutting block having no break point.

Firstly, description is given regarding a method of calculating the amount of time for post-machining steps, which includes a portion (specifically, an amount of time for deburring work) that occupies a large amount of time in the amount of time for post-machining steps in the example (a). Regarding deburring in the example (a), this is a method of calculating the amount of time for post-machining steps in a case where a portion for which burrs are likely to occur in terms of a machining shape during machining, specifically where an orthogonal tool path arises, and in a case where material having high viscosity such as aluminum is used as the material of the workpiece.

For example, the amount of machining time estimation unit 311 calculates a quantity of burrs generated from a formula: (perpendicular processing surface area)×(quantity of burrs generated/cm), based on workpiece information (material, shape). Note that the perpendicular processing surface area is a portion where the angle between machined surfaces on a workpiece is 90 degrees, and the quantity of burrs generated/cm is the quantity of burrs generated per unit length.

The amount of machining time estimation unit 311 calculates an amount of time for burr removal from a formula: (quantity of burrs generated)×(amount of time for aluminum burr removal/unit quantity)+(amount of rest time for worker). Note that the amount of time for aluminum burr removal/unit quantity is the amount of time for burr removal per unit quantity, which is preset for a case where a workpiece is made from aluminum. In addition, it may be that the amount of rest time for a worker is set for a case where the quantity of burrs generated is equal to or greater than predetermined threshold set in advance, and may be an actual measurement value or an empirical value.

Next, based on the information pertaining to non-machining work (list of amounts of time for work), the amount of machining time estimation unit 311 calculates an amount of measurement-related time from a formula: (amount of time for conveyance to a measurement area)+(amount of time for workpiece attaching)+(amount of time for measurement). Based on the information pertaining to non-machining work (list of amounts of time for work), the amount of machining time estimation unit 311 calculates the amount of time for post-machining steps from a formula: (amount of time for conveyance to burr removal area)+(amount of time for burr removal)+(amount of measurement-related time).

Note that, regarding deburring in the example (a), this is a method of calculating the amount of time for post-machining steps in a case where a portion for which burrs are likely to occur in terms of a machining shape during machining, specifically where an orthogonal tool path arises, and the amount of machining time estimation unit 311 can calculate the amount of time for post-machining steps similarly to as described above, even for a workpiece made of a material that is not aluminum. In this case, a portion for (quantity of burrs generated) decreases in a case for a workpiece made of a material that has a low viscosity and is not aluminum.

Regarding the method of calculating the amount of time for post-machining steps in a case where there is a straight-line machining command from which there is no release in lathe-turning machining for the example (b).

For example, based on the workpiece information (material, shape), the amount of machining time estimation unit 311 calculates an amount of chips generated from a formula: (straight-line movement distance)×(amount of cutting). Note that the straight-line movement distance is a movement distance for straight-line lathe-turning obtained by analyzing a machining program.

The amount of machining time estimation unit 311 calculates an amount of time for removing chips from a formula: (function pertaining to amount of chips generated and number of cuts)+(amount of rest time for worker). Note that the function pertaining to amount of chips generated and number of cuts may, for example, be a formula: (amount of chips generated)×(number of cuts)2×(reference amount of removal time), or may be obtained from a table for actual results (not shown) for actual amounts of time for removal, for each amount of chips generated. In addition, the reference amount of removal time is an amount of time for chip removal that has been set in advance as a reference. Note that the amount of time for removing chips changes because a chip shape changes in accordance with the metal material making up a workpiece that is machined.

Next, based on the information pertaining to non-machining work (list of amounts of time for work), the amount of machining time estimation unit 311 calculates an amount of measurement-related time from a formula: (amount of time for conveyance to a measurement area)+(amount of time for workpiece attaching)+(amount of time for measurement). The amount of machining time estimation unit 311 calculates the amount of time for post-machining steps as the greater value from among (amount of measurement-related time) and (amount of time for removing chips) when work for performing measurement and chip removal in parallel is possible, for example.

As above, the amount of machining time estimation unit 311 calculates the amount of manufacturing time by adding together the amount of time for pre-machining steps, the amount of metal machining time, and the amount of time for post-machining steps.

<Shortening Means Determination Unit 312>

The shortening means determination unit 312 selects, from a plurality of means that have been stored in advance in the improvement means list 332 in the storage unit 330, a means for shortening the amount of manufacturing time by reducing the amount of time for at least one work step from among the amount of time for pre-machining steps, the amount of metal machining time, and the amount of time for post-machining steps that were estimated by the amount of machining time estimation unit 311.

As with the example (a) described above, regarding deburring, description is given regarding action by the shortening means determination unit 312 in a case where there arises a portion for which burrs are likely to occur in terms of a machining shape during machining, for example a tool path for which an angle between machined surfaces on a workpiece is 90 degrees. Firstly, the shortening means determination unit 312, for example, analyzes the machining program to thereby extract a portion for which burrs are likely to occur in terms of a machining shape for which there will be a surface angle close to 90 degrees in a tool path, and extracts this portion as a portion that requires consideration as to whether the angle of the portion can be changed.

Figure 2:
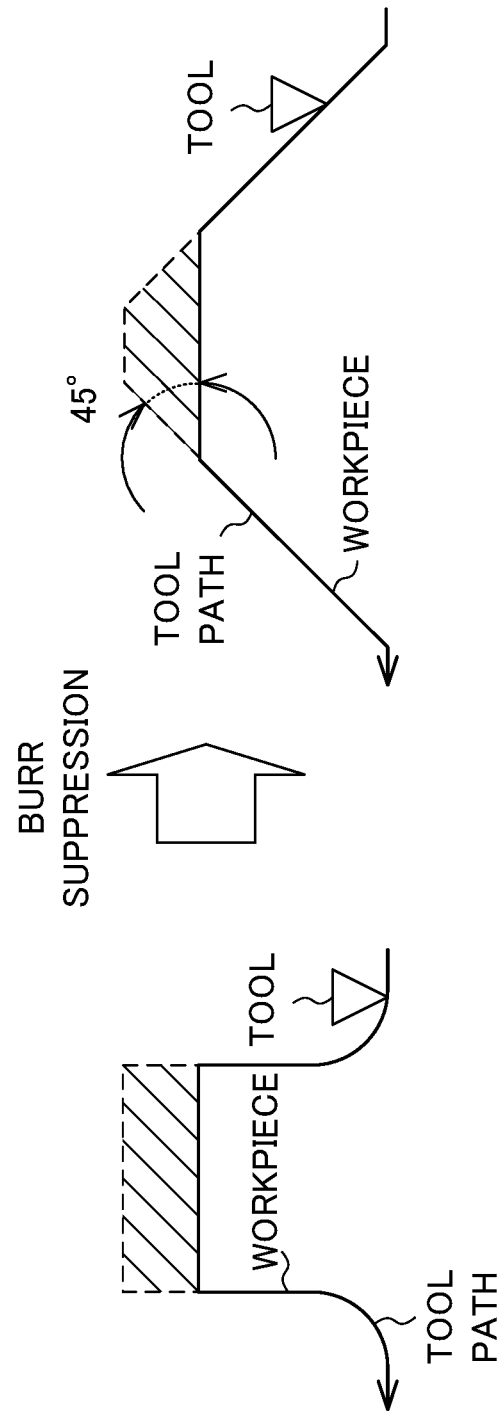
FIG. 2 illustrates an example of burr suppression.

FIG. 2 illustrates an example of burr suppression.

The shortening means determination unit 312 may select a means such as "re-doing from structural design to a shape less likely to generate burrs" from the improvement means list 332 as a means for correcting (the design of) the machining program so as to provide, instead of a perpendicular, a slope as with a chamfer for a cutting area (burrs are also small in the case of a short distance) for the extracted portion, as illustrated in FIG. 2.

Alternatively, the shortening means determination unit 312 may, for example, select a means such as a "tool less likely to generate burrs" in a case where a workpiece made of a material for which burrs are more likely to occur even with the same machining program has been selected.

However, in such a case, a need to change the structure of the machined product in order to reduce the quantity of burrs, and a need to recalculate the strength or the like of the machined product arises because this means changing the shape that was originally desired. Accordingly, a review at the design stage, which is before machining, becomes necessary. Accordingly, as described below, the notification unit 313 can notify an operator that such work is necessary.

Next, description is given regarding action by the shortening means determination unit 312 in a case where there is a straight-line machining command from which there is no release in lathe-turning machining (for example a case where there is lathe machining and there is a portion for which it is determined that an amount of cutting will be large from a comparison of coordinate values to that of the original workpiece shape or a case in which there is a portion in which there is a long cutting block having no break point), in the example (b) described above.

In such a case, the greater the size of chips, the more chips get entangled with each other, and the amount of time to remove them from inside the machine tool 10 rapidly increases. Especially in a case of lathe-turning (lathe machining), chips having a length of several tens of cm frequently occur, depending on the machining program. Accordingly, the shortening means determination unit 312, for example, may select from the improvement means list 332 a means such as an "oscillation cutting function" for finely dividing chips in a case of, by analyzing the machining program, having detected lathe-turning and a portion for which chips will be greater in size (such as there being a portion for which a straight-line cutting movement distance is long) from the machining program. As a result, it may be that an amount of time for removing the chips from within the machine tool 10 is calculated, based on the information pertaining to non-machining work (list of amounts of time for work) corresponding to the size of the chips, for example.

In addition, because a horizontal machining center as the machine tool 10 will have smooth ejection of chips in comparison to a vertical machining center, although there is also a dependence on an equipment status, the shortening means determination unit 312 may select using another machine as the machine tool 10 as a means for shortening the amount of manufacturing time. However, in such a case, the later-described notification unit 313 can notify an operator of a determination of whether it is possible to change to a horizontal machining center.

Note that the shortening means determination unit 312 is not limited to selecting one means for shortening the amount of manufacturing time, and may select two or more means. However, in a case where a plurality of the "tool less likely to generate burrs" means are selected, the shortening means determination unit 312 may select, from the improvement means list 332 a means for "selecting a tool less likely to generate burrs".

In addition, in addition to selecting a means for shortening the amount of manufacturing time, the shortening means determination unit 312 may calculate an amount of time by which the amount of manufacturing time changes in a case where the selected means is employed.

<Notification Unit 313>

The notification unit 313 notifies the means for shortening the amount of manufacturing time selected by the shortening means determination unit 312.

Specifically, the notification unit 313, for example, may display the selected means for shortening the amount of manufacturing time on a display device (not shown), such as a liquid crystal display included in the information processing device 30. Alternatively, the notification unit 313, for example, may output, by audio, the means for shortening the amount of manufacturing time from a speaker (not shown) included in the information processing device 30.

Note that it may be that the notification unit 313 does not notify the selected means for shortening the amount of manufacturing time in a case where it is clear that it is not possible to reflect the means for shortening the amount of manufacturing time selected by the shortening means determination unit 312. In this case, it may be that the means reflection unit 314, which is described below, automatically causes the selected means for shortening the amount of manufacturing time to be reflected to the machining program, the control device 20, and/or the machine tool 10.

<Means Reflection Unit 314>

The means reflection unit 314 may accept, via the input unit 320, an instruction from a user regarding whether to employ a means for shortening the amount of manufacturing time, and cause the means for shortening the amount of manufacturing time to be reflected to the machining program and/or the machine tool 10 in a case of employing the means for shortening the amount of manufacturing time.

Specifically, for example, in a case where the means "re-doing from structural design to a shape less likely to generate burrs" is notified by the notification unit 313 as described above, the means reflection unit 314 accepts, via the input unit 320, an instruction by a user regarding whether to carry out the means "re-doing from structural design to a shape less likely to generate burrs". In a case of having accepted an instruction to carry out the means "re-doing from structural design to a shape less likely to generate burrs", the means reflection unit 314 may, in order to reduce the quantity of burrs, change the structure of a machined product resulting from machining a workpiece. In this case, because this means making a change from the originally desired shape, it is necessary to recalculate, inter alia, the strength of the machined product, and thus a review at the design stage before machining is started.

In addition, for example, in a case where the means "tool less likely to generate burrs" is notified by the notification unit 313, the means reflection unit 314 accepts, via the input unit 320, an instruction from a user on whether to use the means "tool less likely to generate burrs". The means reflection unit 314 may change the machining program in order to swap to a tool that is less likely to generate burrs in a case where an instruction to use the means "tool less likely to generate burrs" is accepted.

Note that, in a case where a plurality of means for "tool less likely to generate burrs" are notified by the notification unit 313, it may be that, for example, the means reflection unit 314 makes it such that a user determines the necessity of each tool and selects one tool from among the plurality of tools based on an amount of time by which the amount of manufacturing time will change in a case where each tool is employed, the amount of time being displayed on a display device (not shown) belonging to the information processing device 30.

In addition, for example, in a case where a means "oscillation cutting function" is notified by the notification unit 313, the means reflection unit 314 accepts, via the input unit 320, an instruction from a user regarding whether to use the means "oscillation cutting function". In a case of having accepted an instruction to use the means "oscillation cutting function", the means reflection unit 314 may change the machining program in order to perform oscillation cutting. In this case, for example, regarding a setting for a parameter value pertaining to oscillation cutting, a table of recommended values may be stored in advance in the storage unit 330.

FIG. 3 illustrates an example of a table of recommended values.

In addition, in a case of oscillation cutting, because there is a program command for validing/invaliding oscillation cutting, the notification unit 313 may give, as an option, validing oscillation cutting after setting oscillation cutting to disabled.

In addition, in a case where a notification has been made by the notification unit 313 regarding the appropriateness of employing a horizontal machining center in place of a vertical machining center, as described above, it may be that an instruction for whether to employ a vertical machining center is accepted via the input unit 320 from a user, and a machine tool in a machining step is changed in order to employ the vertical machining center.

Note that, in a case where means for shortening the amount of manufacturing time is notified by the notification unit 313, the means reflection unit 314 accepts from a user via the input unit 320 whether to employ the notified means for shortening the amount of manufacturing time, but there is no limitation to this. For example, as described above, in a case where it is clear that it is not possible to reflect a means for shortening the amount of manufacturing time selected by the shortening means determination unit 312, the means reflection unit 314 may automatically cause the selected means for shortening the amount of manufacturing time to be reflected to the machining program, the control device 20, and/or the machine tool 10.

<Amount of Machining Time Shortening Process in Information Processing Device 30>

Next, description is given regarding an example of operation pertaining to an amount of machining time shortening process in the information processing device 30.

FIG. 4 is a flow chart for describing one example of an amount of machining time shortening process for metal machining, in the information processing device 30.

In Step S11, from the machining-related data for amount of manufacturing time estimation 331 stored in the storage unit 330, the amount of machining time estimation unit 311 estimates work steps that are pre-machining steps, metal machining, and post-machining steps necessary to machine a workpiece and calculates an amount of time for each estimated work step.

In Step S12, the amount of machining time estimation unit 311 calculates the amount of manufacturing time by adding together the amount of time for pre-machining steps, the amount of metal machining time, and the amount of time for post-machining steps.

In Step S13, the shortening means determination unit 312 selects, from the improvement means list 332, a means for shortening the amount of manufacturing time by reducing the amount of time for at least one work step from among the amount of time for pre-machining steps, the amount of metal machining time, and the amount of time for post-machining steps that were estimated in Step S11.

In Step S14, the shortening means determination unit 312 determines whether a means for shortening the amount of manufacturing time was selected in Step S13. In a case where a means for shortening the amount of manufacturing time was selected, the process proceeds to Step 315. In contrast, in a case where a means for shortening the amount of manufacturing time was not selected, the amount of machining time shortening process ends.

In Step S15, the notification unit 313 notifies the means for shortening the amount of manufacturing time selected in Step S13.

In Step S16, the means reflection unit 314 determines whether an instruction for employing the means for which the notification was performed in Step S15 has been accepted from a user via the input unit 320. In a case of employing the means for which the notification was made, the process proceeds to Step S17. In contrast, in a case of not employing the means for which the notification was made, the amount of machining time shortening process ends.

In Step S17, the means reflection unit 314 causes the selected means for shortening the amount of manufacturing time to be reflected to the machining program, the control device 20, and/or the machine tool 10.

As above, from the machining-related data for amount of manufacturing time estimation 331 stored in the storage unit 330, the information processing device 30 according to one embodiment estimates work steps such as machining a workpiece and conveying the workpiece, and calculates an amount of time for each estimated work step to thereby calculate an amount of manufacturing time necessary to machine the workpiece. The information processing device 30 selects, from a plurality of means stored in advance in the improvement means list 332, a means for reducing the estimated amount of time for each work step and thereby shorten the amount of manufacturing time.

As a result, the information processing device 30 can easily select a means for shortening an amount of time required for each work step and shortening the amount of manufacturing time. In addition, a user can easily make a determination as to the necessity of reducing the amount of manufacturing time, and can connect to shortening of the amount of manufacturing time.

This concludes the description above regarding one embodiment, but the information processing device 30 is not limited to the embodiment described above, and include variations, improvements, etc. in a scope that enables an objective to be achieved.

<Variation>

In the embodiment described above, the information processing device 30 is given as a device different to the control device 20 or the machine tool 10, but there is no limitation to this. For example, the information processing device 30 may be included in the control device 20. In addition, the control device 20 may be included in the machine tool 10.

Note that each function included in the information processing device 30 according to the one embodiment may each be realized by hardware, software, or a combination of these. Being realized by software means being realized by a computer reading and executing a program.

A program can be stored using various types of non-transitory computer-readable mediums and supplied to a computer. A non-transitory computer-readable medium includes various types of tangible storage mediums. An example of a non-transitory computer-readable medium includes a magnetic recording medium (for example, a floppy disk, magnetic tape, or a hard disk drive), a magneto-optical recording medium (for example, a magneto-optical disk), a CD-ROM (read-only memory), CD-R, CD-R/W, and a semiconductor memory (for example, a mask ROM, a programmable ROM (PROM), an erasable PROM (EPROM), a flash ROM, or a RAM). In addition, a program may be supplied to a computer by various types of transitory computer-readable mediums. An example of a transitory computer-readable medium includes an electrical signal, an optical signal, or electromagnetic waves. A transitory computer-readable medium can supply a program to a computer via wired communication channel such as an electrical wire or an optical fiber, or via a wireless communication channel.

Note that steps that express a program recorded to a recording medium of course include processing in chronological order following the order of these steps, but also include processing that is executed in parallel or individually, with no necessity for processing to be performed in chronological order.

To rephrase, the information processing device and information processing method according to the present disclosure can have various embodiments which have configurations such as the following.

(1) The information processing device 30 according to the present disclosure extracts, with respect to the control device 20 that calculates an output pulse to a motor included in the machine tool 10 based on a machining program, a means for shortening an amount of manufacturing time for a pre-machining step, a machining step, and a post-machining step in the manufacture of a machined product using the control device 20, the information processing device 30 including:

the storage unit 330 that stores the machining-related data for amount of manufacturing time estimation 331 relating to machining of a workpiece and including the machining program; the amount of machining time estimation unit 311 that estimates, from the machining-related data for amount of manufacturing time estimation 331 stored in the storage unit 330, at least one work step necessary for machining of the workpiece and calculates an amount of manufacturing time necessary for machining of the workpiece by calculating an amount of time for the estimated at least one work step; and the shortening means determination unit 312 that selects, from a plurality of means stored in advance in the storage unit 330, a means for reducing the amount of time for the at least one work step estimated by the amount of machining time estimation unit 311 and shortening the amount of manufacturing time.

By virtue of this information processing device 30, it is possible to easily select a means for shortening an amount of time required for each work step and shortening the amount of manufacturing time.

(2) The information processing device 30 according to (1) may include the notification unit 313 that notifies the means for shortening the amount of manufacturing time selected by the shortening means determination unit 312.

As a result, the information processing device 30 can present an optimal means for shortening the amount of manufacturing time to a user.

(3) In the information processing device 30 according to (2), it may be that the shortening means determination unit 312 calculates an amount of time by which the amount of manufacturing time changes in a case where the selected means for shortening the amount of manufacturing time is employed, and the notification unit 313 notifies the means for shortening the amount of manufacturing time selected by the shortening means determination unit 312, and the calculated amount of time by which the amount of manufacturing time changes.

As a result, the information processing device 30 can facilitate a determination by a user regarding the necessity of a means for shortening the amount of manufacturing time.

(4) The information processing device 30 according to any one (1) to (3) may further include: the input unit 320 that accepts an input from a user; and the means reflection unit 314 that accepts, via the input unit 320, an instruction from the user on whether to employ the means for shortening the amount of manufacturing time and, in a case of employing the means for shortening the amount of manufacturing time, reflects the means for shortening the amount of manufacturing time to the machining program, the control device 20, and/or the machine tool 10.

As a result, the information processing device 30 can cause a selected means for shortening the amount of manufacturing time to be easily reflected to a machining program and/or a machine tool.

(5) An information processing method according to the present disclosure is adapted for the information processing device 30 configured to extract, with respect to the control device 20 that calculates an output pulse to a motor included in the machine tool 10 based on a machining program, a means for shortening an amount of manufacturing time for a pre-machining step, a machining step, and a post-machining step in the manufacture of a machined product using the control device 20. The information processing method includes: an amount of machining time estimation step for estimating, from the machining-related data for amount of manufacturing time estimation 331 that relates to machining of a workpiece, includes a machining program, and is stored in the storage unit 330 included in the information processing device 30, at least one work step necessary for machining of the workpiece and for calculating an amount of manufacturing time necessary for machining of the workpiece by calculating an amount of time for the estimated at least one work step; and a shortening means determination step for selecting, from a plurality of means stored in advance in the storage unit 330, a means for reducing the amount of time for the estimated at least one work step and shortening the amount of manufacturing time.

By virtue of this information processing method, it is possible to achieve a similar effect to that for (1).

EXPLANATION OF REFERENCE NUMERALS

1 Information processing system
10 Machine tool
20 Control device
30 Information processing device
310 Control unit
311 Amount of machining time estimation unit
312 Shortening means determination unit
313 Notification unit
314 Means reflection unit
320 Input unit
330 Storage unit
331 Machining-related data for amount of manufacturing time estimation
332 Improvement means list

The invention claimed is:

1. An information processing device configured to extract, with respect to a control device that calculates an output pulse to a motor included in a machine tool based on a machining program, a means for shortening an amount of manufacturing time for a pre-machining step, a machining step, and a post-machining step in manufacture of a machined product using the control device, the information processing device comprising:
a non-transitory storage unit configured to store machining-related information that relates to machining of a workpiece and includes the machining program;
an amount of machining time estimation unit configured to estimate, from the machining-related information stored in the non-transitory storage unit, at least one work step necessary for machining of the workpiece and calculate an amount of manufacturing time necessary for machining of the workpiece by calculating an amount of time for the estimated at least one work step; and
a shortening means determination unit configured to select, from a plurality of means stored in advance in the non-transitory storage unit, a means for reducing the amount of time for the at least one work step estimated by the amount of machining time estimation unit and shortening the amount of manufacturing time.

2. The information processing device according to claim 1, further comprising:
a notification unit configured to notify the means for shortening the amount of manufacturing time selected by the shortening means determination unit.

3. The information processing device according to claim 2, wherein
the shortening means determination unit calculates an amount of time by which the amount of manufacturing time changes in a case where the selected means for shortening the amount of manufacturing time is employed, and
the notification unit notifies the means for shortening the amount of manufacturing time selected by the shortening means determination unit, and the calculated amount of time by which the amount of manufacturing time changes.

4. The information processing device according to claim 1, further comprising:
an input unit configured to accept an input from a user; and
a means reflection unit configured to accept, via the input unit, an instruction from the user on whether to employ the means for shortening the amount of manufacturing time and, in a case of employing the means for shortening the amount of manufacturing time, reflect the means for shortening the amount of manufacturing time to the machining program, the control device, and/or the machine tool.

5. An information processing method adapted for an information processing device, the information processing device being configured to extract, with respect to a control device that calculates an output pulse to a motor included in a machine tool based on a machining program, a means for shortening an amount of manufacturing time for a pre-machining step, a machining step, and a post-machining step in manufacture of a machined product using the control device, the information processing method comprising:
an amount of machining time estimation step for estimating, from machining-related information that relates to machining of a workpiece, includes a machining program, and is stored in a non-transitory storage unit included in the information processing device, at least one work step necessary for machining of the workpiece and for calculating an amount of manufacturing time necessary for machining of the workpiece by calculating an amount of time for the estimated at least one work step; and
a shortening means determination step for selecting, from a plurality of means stored in advance in the non-transitory storage unit, a means for reducing the amount of time for the estimated at least one work step and shortening the amount of manufacturing time.

* * * * *